(12) United States Patent
Ratermann

(10) Patent No.: US 9,880,320 B2
(45) Date of Patent: Jan. 30, 2018

(54) TANK SENSOR ARRAY FOR INVENTORY SIGNALING IN A TANK MANAGEMENT SYSTEM

(71) Applicant: George W. Ratermann, Livermore, CA (US)

(72) Inventor: George W. Ratermann, Livermore, CA (US)

(73) Assignee: RATERMANN MANUFACTURING, INC., Livermore, CA (US)

( * ) Notice: Subject to any disclaimer, the term of this patent is extended or adjusted under 35 U.S.C. 154(b) by 551 days.

(21) Appl. No.: 14/509,532

(22) Filed: Oct. 8, 2014

(65) Prior Publication Data

US 2016/0103244 A1    Apr. 14, 2016

(51) Int. Cl.
| | | |
|---|---|---|
| G06F 19/00 | (2011.01) | |
| G01V 99/00 | (2009.01) | |
| G01L 1/16 | (2006.01) | |
| G06Q 10/08 | (2012.01) | |
| G01D 5/24 | (2006.01) | |

(52) U.S. Cl.
CPC .............. *G01V 99/00* (2013.01); *G01L 1/16* (2013.01); *G06Q 10/087* (2013.01); *G01D 5/24* (2013.01)

(58) Field of Classification Search
CPC ..................................................... B65D 90/50
USPC .......................... 702/150, 155, 182–185, 188
See application file for complete search history.

(56) References Cited

U.S. PATENT DOCUMENTS

| | | | |
|---|---|---|---|
| 4,636,950 A | 1/1987 | Caswell et al. | |
| 5,505,473 A | 4/1996 | Radcliffe | |
| 6,761,194 B1 | 7/2004 | Blong | |
| 7,304,588 B2 | 12/2007 | Ingalsbe et al. | |
| 7,619,523 B2 | 11/2009 | Durtschi et al. | |
| 8,159,358 B2 * | 4/2012 | van Schie | B65D 90/50 116/109 |
| 2007/0050271 A1 * | 3/2007 | Ufford | G06Q 10/087 705/28 |
| 2008/0084306 A1 | 4/2008 | Durtschi et al. | |
| 2011/0140850 A1 | 6/2011 | Wassel et al. | |
| 2012/0292399 A1 | 11/2012 | Launiainen | |
| 2012/0299314 A1 | 11/2012 | Jiang | |
| 2013/0049382 A1 | 2/2013 | Day et al. | |
| 2014/0163727 A1 | 6/2014 | Siamer | |

OTHER PUBLICATIONS

W.J. Bell et al., Improving the Distribution of Industrial Gases with an On-line Computerized Routing and Schedfuling Optimizer, Air Products & Chemicals, Inc., Dec. 6, 1983, pp. 4-23.

* cited by examiner

*Primary Examiner* — Edward Raymond
(74) *Attorney, Agent, or Firm* — Thomas Schneck

(57) ABSTRACT

A tank inventory signaling apparatus that has gas cylinder tanks stored on a pad having an array of spots to mark tank placement. Tanks are placed directly over the spots in a grid of rows and columns. Sensors below each spot act as weight or proximity sensors indicating the presence or absence of a tank. The sensors are connected to logic that monitors the state of all sensors. Tank inventory is inferred by changes of state of the sensor grid since it is necessary to change sensor state to remove a tank. Sensor states are reported to a remote server having associated tank management and supply software and route management software. In this manner, local tank usage can be tracked at remote locations for resupply of tanks and delivery of replacement tanks can be optimized.

8 Claims, 3 Drawing Sheets

US 9,880,320 B2

TANK SENSOR ARRAY FOR INVENTORY SIGNALING IN A TANK MANAGEMENT SYSTEM

TECHNICAL FIELD

The invention relates to tank cylinder inventory signaling from a storage location in a tank management system.

BACKGROUND ART

Industrial concerns, such as hospitals, welding shops, chemical processing plants and similar businesses, use large number of cylinders of industrial gases. Cylinders are delivered to such businesses in full condition and picked up after use. The cylinders are heavy, expensive and must be carefully stored. Methods for distribution and inventory control have been a subject of much research over the years. For example, see the paper in Interfaces 13, 6 Dec. 1983, p. 4-23 entitled "Improving the Distribution of Industrial Gages with an On-Line Computerized Routing and Scheduling Optimizer" by W. J. Bell et al. The article describes the efforts of Air Products and Chemicals, Inc. to implement industrial gas cylinder inventory management at customer locations with delivery vehicle scheduling. A sophisticated software algorithm for the project is described. An essential part of the gas cylinder management problem is knowing the present inventory of full and empty tanks. Usually a customer is responsible for inventory status and different customers have different approaches.

In U.S. Pat. No. 7,619,523 to F. Durtschi et al. describe "Gas Cylinders Monitoring by Wireless Tags". In this system, each gas cylinder includes a RDID transponder configured to transmit a RFID signal received by a RFID receiver connected to a server. The gas cylinder data received by the server is collected in a database and thereafter used by a gas cylinder management software application. Published Patent Application 2011/0140850 describes a transport cap for gas cylinders where the cap supports RFID devices for gas cylinder tracking. A generic tank monitoring system is disclosed in U.S. Pat. No. 7,304,588 to D. Ingalsbe et al. In published U.S. Patent Application 2014/0163727 to Y. Siaamer et al. describe a gas cylinder management system where tanks are identified by optically sensing the color markings of a tank or for detecting ferromagnetic material identifiers. In U.S. Pat. No. 5,505,473 to F. Radcliffe discloses a mobile cart with shelves with radio communication of inventory on the shelves. A scanner can identify the inventory and communicates with a terminal regarding the location identifiers.

An object of the invention is to monitor use of tank cylinders at end user locations and report used tanks to a tank management cylinder system.

SUMMARY DISCLOSURE

One of the inputs for tank management software for industrial gas cylinders comes from a tank farm where tanks are stored prior to use. The present invention contemplates a tank grid on a pad that has tank sensors below spots on the pad where gas cylinder tanks are stored, aligning multiple tanks in rows and columns, in a grid pattern, with tanks on separate weight sensors that are part of a signaling system. Sensors can detect tank weight or, alternatively tank proximity to a sensor. In any case, two logic states correspond to the presence and absence of a tank over a shot. The signaling system of a tank storage unit, i.e. a grid with tank sensors, reports to a local server that maintains a database of tanks in the grid. The sensors may be switches or transducers that discriminate between the presence and absence of tanks. The multiple sensors are networked to the local server so that an initial state of all sensors can be established. In the case of switches, as each switch is opened, for example, upon removal of a gas cylinder tank for use, the change of state of the switch grid is monitored and tank movement from the grid is inferred by the switch openings. Other sensors would operate similarly. A plurality of local servers is connected via the Internet or otherwise to a remote server that is associated with tank management and supply software and route management software. The remote server tracks tank usage from the tank storage units and orders replacement tanks and optimizes delivery of replacement tanks. The remote server can display tank management information via a website or a smart phone app.

DETAILED DESCRIPTION

Figure 1:
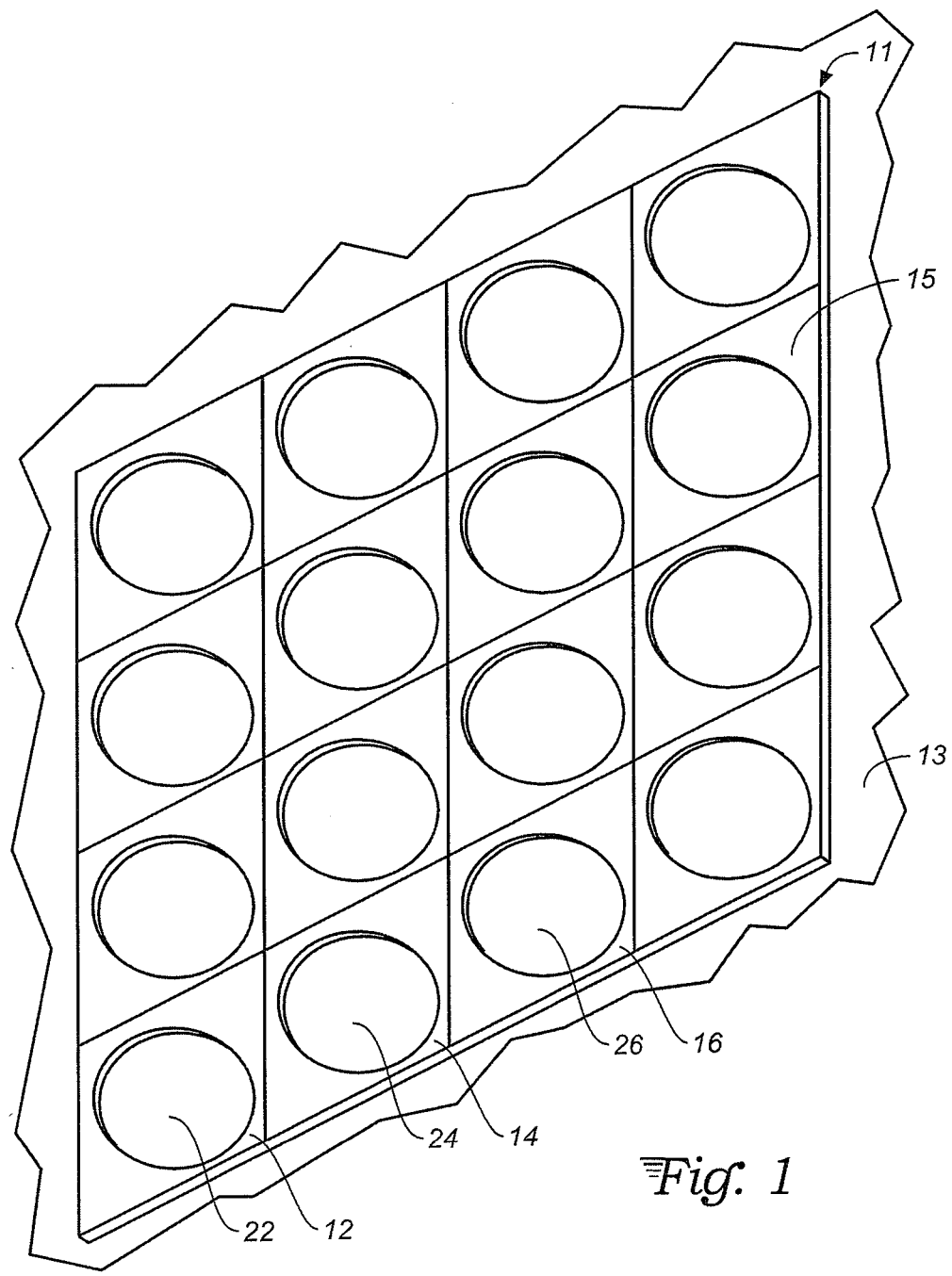
FIG. 1 is a perspective plan view of a tank storage pad in accordance with the invention.

With reference to FIG. 1, a tank storage pad 11 is shown having a visually perceptible array of squares 15 with individual squares 12, 14, 16. The storage pad 11 is placed on floor 13 that is a tank storage location.

The array of squares 15 on pad 11 can be implemented in a sheet having a construction described below. The sheet has marked circles or spots 22, 24, 26 for locating bases gas storage tanks. The array of squares 15 on pad 11 need not be visually perceptible but the circles or spots 22, 24, 26 must be visually perceptible in order to indicate tank placement and wherein the spots are arranged in a grid pattern with the spots being mutually separated by a distance allowing clearance between gas cylinder tanks. The array of squares is an allocation of physical tank storage space, with each square large enough to situate a gas storage tank. A spot may be any geometric figure that indicates a grid square. For example, spots maybe triangles, X's, ovals or even squares, so long as each spot is in a grid square.

Each spot indicates the location of a tank sensor that may be a normally open switch or another transducer adapted to have two states. When a tank is placed on the spot, the sensor detects a tank as the switch closes. Conductive contacts separated by a spring would serve as a switch.

Figure 2:
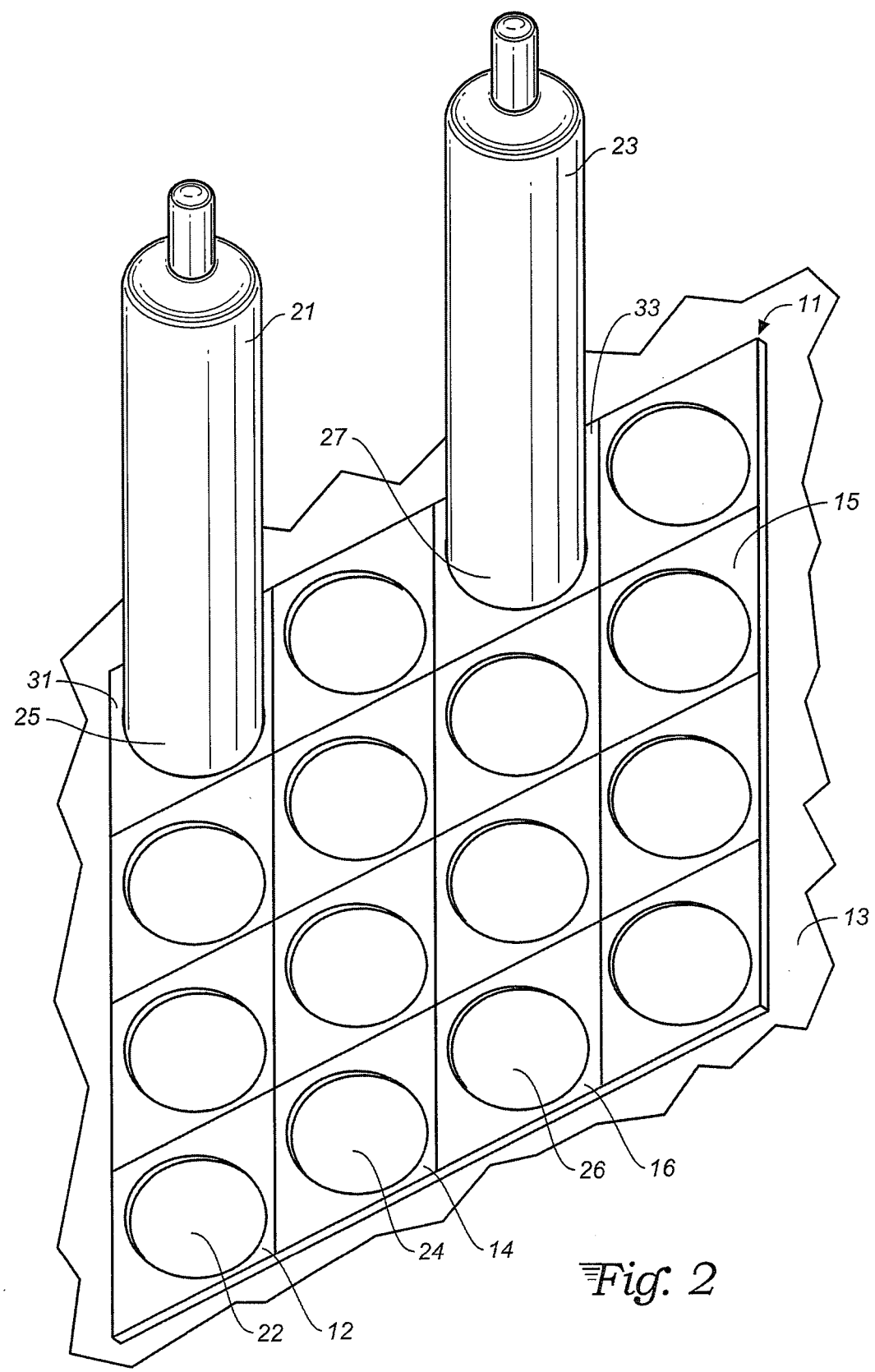
FIG. 2 is a perspective plan view of the tank pad of FIG. 1 with gas cylinder tanks in storage locations.

With reference to FIG. 2, gas cylinder tanks 21 and 23 have been placed on spots 25 and 27 in the square locations 31 and 3, respectively. Beneath each tank, a switch is closed, signaling the presence of a tank while other switches of the array are often. For an array of 16 storage locations, as shown in FIG. 2, two switches would be closed and 14 switches open.

Figure 3:
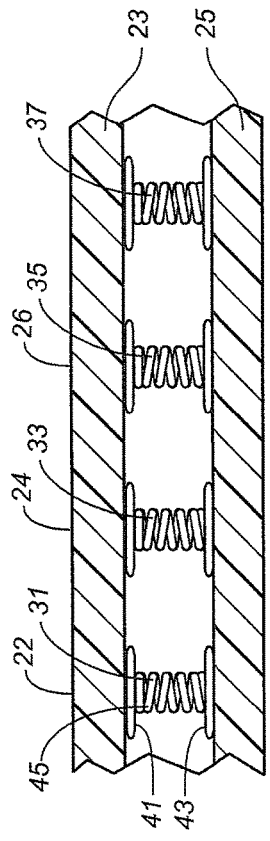
FIG. 3 is a side view of the tank storage pad of FIG. 1.

With reference to FIG. 3, a portion of a pad 21 shown having a sandwich construction and serving as the sheet embodying an array of squares described in FIG. 1. The pad 21 has a first insulative planar member 23 separated from a second insulative planar member 25 by normally open switches 31, 33, 35, 37. Each switch has spaced apart planar metal laminar contacts, such as contacts 41 and 43, which are preferably circular and having a diameter approximating a tank cylinder diameter. Separating the metal laminar contacts is a spring, such as helical spring 45, having a diameter less than the diameter of the spaced apart laminar contacts. When a tank is placed on pad 21, over a spring, the spring compresses and the edges of the contacts bend beneath the weight of the tank rim, causing opposed contact members to come into electrical and physical contact and close the switch. When a tank is removed from its position, the edges of the laminar contacts separate and the switch is again open. The contacts must have a memory characteristic to return to its original position. Thin steel contacts have such a characteristic. Piezo transducers can also work as tank weight sensors, instead of switches, discriminating between tank presence on a spot and tank removal. A piezo transducer generates a voltage when force is applied to the transducer, as by tank weight on the transducer. Removal of the tank causes removal of the voltage. Hence, two logic states are established. Other transducers such as capacitive sensors will also work. A capacitive sensor does not sense tank weight, but tank proximity to the sensor.

In FIG. 3, the sandwich construction of the pad 21 feature the first insulative planar member 23 carrying painted spots 22, 24, 26, etc. directly over the switches 31, 33, 35, and 37. The painted spots are storage locations for gas cylinders and correspond to spots 22, 24, 26, etc. in FIG. 1. The insulative members 23 and 25 may be the same or different material. Construction grade Tyvek material is an exemplary material for the first and second planar members, where Tyvek is a registered trademark of DuPont Corporation for high density polyethylene fibers in a non-woven material usually available in rolls. Other materials, such as canvass or even sheet cardboard will also work. Opposing contacts are adhered to each insulative planar member 23 so that switches can be formed. A helical spring having only a few turns is joined to each contact on the lower insulative planar member and then the upper planar member is placed over the lower planar member. A U-shaped steel staple can be fastened to the upper end of each spring. When the upper planar member is forced down on the lower planar member, the staple is positioned to punch through the upper laminar contact and the upper insulative planar member. To facilitate the ability of the staple to punch through the upper laminar contact, the upper contact may have closely spaced apart perforations. The staple will readily find its way through such perforations without bending. The staple is then closed by joining opposite ends and the corresponding spring is fastened in place. The sandwich construction is now complete with an array of spots serving to designate storage locations for gas cylinders using the switch grid associated with the spots for tank storage locations.

The dimension of each square that situates a spot exceeds the width of a gas cylinder tank by a slight amount such that an array of tanks may be aligned on pad 11 as shown in FIG. 1.

When gas cylinders tanks are placed on all of the spots, all of the switches are closed. Then, as each tank is removed, a switch is opened and latched so that the switch remains open until reset. When all switches are closed, the grid of spots appears to have a full rectangular array of gas cylinder tanks in rows and columns.

Figure 4:
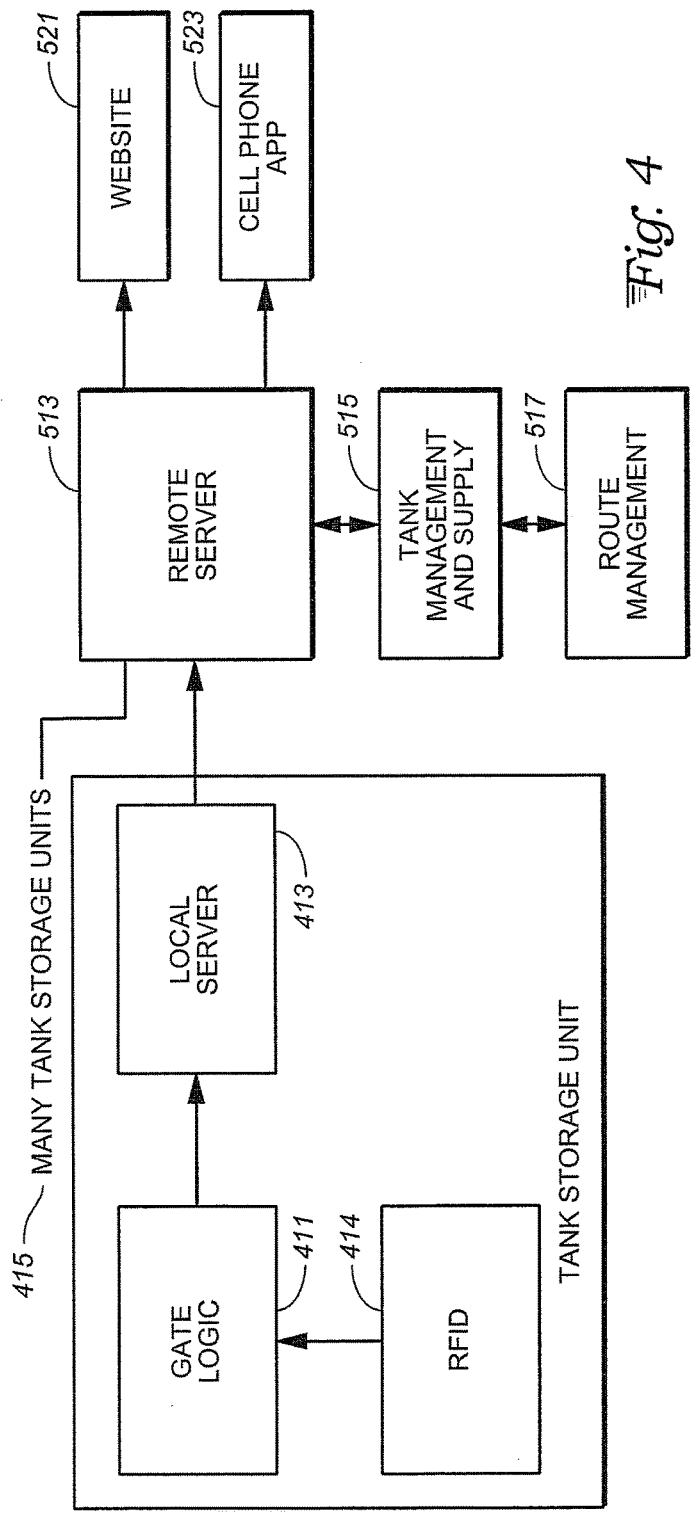
FIG. 4 is an electrical plan of a tank inventory signaling system in accordance with the invention.

The initial state of the switches is set in gate logic 411, seen in FIG. 4. Gate logic 411 consists of memory or FPGAs that monitor changes in the initial state to the next state, and so on. When a switch is open to remove a tank, there is a gate state change monitored by a database in local server 413. Tanks can optionally be equipped with an RFID chip that can be read as a tank passes in proximity to an RFID chip reader 414 which feeds information to gate logic 411 in a manner such that a tank being removed from a bin can be identified regarding the contents of the tank. Tanks can optionally be equipped with bar code that is read by passing in front of a bar code reader. In that situation, the bar code reader would be substituted for the RFID chip reader 414.

A switch opening upon removal of a tank represents a change in the state of a tank position grid that is reported to the local server 413. Local reporting may be by a local wire network or a wireless network. The local server 413 reports the switch array state to a remote server 513, via the Internet or a private line. The remote server 513 tracks similar information from other tank storage units 415.

Remote server 513 has a database of tanks removed from bins based upon the switch array states from all connected tank storage units reporting through local servers. This database is used by tank management and supply software 515 that handles ordering, purchasing, stocking, and location of replacement tanks. In turn, the tank management supply module 515 is connected to a route management module 517 that optimizes delivery of replacement tanks. Both tank management and supply software and route management software are well known and have been described in many publications.

The remote server 513 has a video display output that can be an internet website 521 or a cell phone app 523 so that the server database can be graphically shown to users. Tank management supply software 515 and route management software 517 also communicate with the remote server for display of information through the website and the cell phone app.

In operation, if there has been no change in the initial switch array state from a tank storage unit, because no switches have been opened, no replacement tanks are needed for that location and such information can be displayed on a website or a cell phone app. On the other hand, if the switch array state from a tank storage unit shows that two switches in the same row of tanks of the same type have been opened, it is assumed that two replacement tanks of the type stored in that row are now needed. This information is conveyed by a local server to a remote server and then to the website or cell phone app. Replacement tank procurement is handled by the tank management and supply software 515 and delivery is handled by the route management software 517. All of this is facilitated by the tank sensor array of the present invention with switches associates with storage locations which communicate with gate logic as described.

What is claimed is:
1. A tank inventory signaling system comprising:
 a planar pad with visually perceptible spots mutually separated from each other indicating storage locations for an array of gas cylinder tanks by association of a single spot with a single gas cylinder tank whereby the amount of separation is a distance that allows clearance between gas cylinder tanks;
 a sensor associated with each spot, the sensor having a first logic state indicating tank presence and a second logic state indicating tank absence, the changes in logic state associated with tank placement and removal from a spot;
 a networked local server in communication with the sensors for receiving initial logic states of the sensors representing a gas cylinder inventory based upon initial storage locations of gas cylinder tanks in the array and for receiving changes in logic states associated with tank removal from the spots representing a reduction in the gas cylinder inventory; and a remote server in communication with the local server having tank cylinder management software for receiving gas cylinder inventory reduction information whereby the tank cylinder management software orders replacement tanks and optimizes delivery.

2. The apparatus of claim 1 wherein each sensor is a normally open switch.

3. The apparatus of claim 1 wherein the state of each switch communicates with the local server wirelessly.

4. The apparatus of claim 1 wherein the local server communicates with the remote server via the internet.

5. The apparatus of claim 2 wherein the state of each sensor communicates with the local server by a wire network.

6. The apparatus of claim 1 wherein each sensor is a piezo transducer.

7. The apparatus of claim 1 wherein each sensor is a tank proximity sensor.

8. The apparatus of claim 1 wherein each sensor is a capacitive sensor.

* * * * *